(12) United States Patent
Lee

(10) Patent No.: US 10,513,378 B2
(45) Date of Patent: Dec. 24, 2019

(54) APPARATUS OF HOUSING COMPONENT

(71) Applicant: LG INNOTEK CO., LTD., Seoul (KR)

(72) Inventor: Se Hyun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 395 days.

(21) Appl. No.: 15/298,030

(22) Filed: Oct. 19, 2016

(65) Prior Publication Data

US 2017/0113854 A1 Apr. 27, 2017

(30) Foreign Application Priority Data

Oct. 26, 2015 (KR) .................... 10-2015-0148854

(51) Int. Cl.
*B65D 53/06* (2006.01)
*B65D 6/00* (2006.01)
*B65D 43/22* (2006.01)
*B65D 85/68* (2006.01)
*H02G 3/14* (2006.01)

(52) U.S. Cl.
CPC .............. *B65D 53/06* (2013.01); *B65D 7/12* (2013.01); *B65D 43/22* (2013.01); *B65D 85/68* (2013.01); *H02G 3/14* (2013.01)

(58) Field of Classification Search
CPC .......... B65D 53/06; B65D 7/12; B65D 43/22; B65D 85/68
See application file for complete search history.

(56) References Cited

U.S. PATENT DOCUMENTS 5,600,091 A * 2/1997 Rose .................... H05K 9/0015
174/372
2005/0079749 A1* 4/2005 Schmidt ............ H01R 13/5202
439/275

FOREIGN PATENT DOCUMENTS

| DE | 3107455 A1 | 10/1982 |
| DE | 92 06 130 U1 | 7/1992 |
| DE | 4106077 A1 | 9/1992 |
| GB | 2283230 A | 5/1995 |

* cited by examiner

*Primary Examiner* — Steven A. Reynolds
*Assistant Examiner* — Javier A Pagan
(74) *Attorney, Agent, or Firm* — Birch, Stewart, Kolasch & Birch, LLP

(57) ABSTRACT

Disclosed is an apparatus of housing component which includes a case which accommodates a component, a cover which covers the case, and a sealant applied on a joining surface at which the case and the cover join together, wherein a step is formed at the joining surface.

20 Claims, 3 Drawing Sheets

APPARATUS OF HOUSING COMPONENT

CROSS-REFERENCE TO RELATED APPLICATION

This application claims priority to and the benefit of Korean Patent Application No. 2015-0148854, filed on Oct. 26, 2015, the disclosure of which is incorporated herein by reference in its entirety.

BACKGROUND

1. Field of the Invention

The present invention relates to an apparatus of housing component, and more particularly, to an apparatus of housing component for accommodating vehicle components.

2. Discussion of Related Art

Generally, it is important for an apparatus of housing component inside which vehicle components are accommodated to satisfy waterproof requirement or dustproof requirement. FIG. 1 illustrates an example structure for an apparatus of housing component that is waterproof or dustproof. Referring to FIG. 1, for waterproofing or dustproofing an apparatus of housing component 10, a joining surface 16 in which a lower case 12 and an upper cover 14 are in contact with each other is coated with a sealant and then pressed.

Most of the sealant applied on the joining surface 16 in which the lower case 12 and the upper cover 14 are in contact with each other leaks to the inside or the outside of the lower case 12 to form a sealant bead 18, and a portion of the sealant remains on the joining surface 16 in which the lower case 12 and the upper cover 14 are in contact with each other to prevent air or water from penetrating therein.

However, in the apparatus of housing component 10, a gap may be generated between the lower case 12 and the upper cover 14 as time passes by because a sealant amount remaining on the joining surface 16 in which the lower case 12 and the upper cover 14 are in contact with each other is small, and thus air or water may penetrate through the gap. Therefore, an apparatus of housing component with improved waterproof characteristics or dustproof characteristics is necessary.

Meanwhile, although there is an attempt to form a groove at a central region of the joining surface in which the lower case 12 and the upper cover 14 are joining together and to apply a sealant thereon, there arises a problem that a region in which the sealant is hardened is dispersed to the groove, the inside and outside of the lower case, etc. When the region in which the sealant is hardened is dispersed, actual amount of the sealant hardened at the joining surface in which the lower case and the upper cover are joined together and at the inside of the lower case may be reduced, and thereby binding force between the lower case and the upper cover may be weakened.

Particularly, in a situation with an apparatus for housing vehicle components when steel having 3 mm thickness or less by a press type process is attempted to be used as an upper cover or a lower case, a method that may solidly seal the upper cover and the lower case is necessary also when bending occurs at the upper cover or the lower case.

SUMMARY OF THE INVENTION

The present invention is directed to providing an apparatus of housing component with excellent waterproof characteristics and dustproof characteristics.

According to an aspect of the present invention, there is provided an apparatus of housing component including: a case which accommodates a component; a cover which covers the case; and a sealant applied onto a joining surface at which the case and the cover join together, wherein a step is formed at the joining surface.

The case may include a bottom portion and a side portion which extends upward from the bottom portion, wherein the side portion may include a first surface formed at an outer side portion of the case, a second surface formed in the inner side portion of the case, and the joining surface which connects the first surface and the second surface.

A height of the first surface may be formed to be higher than a height of the second surface.

A difference between the height of the first surface and the height of the second surface may be in a range of 0.3 to 2 mm.

Sealant beads may be individually formed at a region in which the cover, the first surface and the joining surface join together and at a region in which the cover, the second surface and the joining surface join together.

A chamfer may be formed at least one of a boundary at which the first surface and the joining surface join together and a boundary at which the second surface and the joining surface join together.

A chamfer may be further formed in a boundary at which a surface formed at an outer side portion of the case is joined to the joining surface of the cover and the case.

According to another aspect of the present invention, there is provided an apparatus of housing component including: a case including a bottom portion, a side portion which extends upward from the bottom portion and configured to accommodate a component; and a cover which covers the case, wherein the side portion includes: a first surface formed at the outer side portion of the case, a second surface formed at the inner side portion of the case; and a joining surface connecting the first surface and the second surface and configured to join to the case, wherein the joining surface includes a first joining surface and a second joining surface having heights different from each other.

The first joining surface may be formed to be higher than the second joining surface.

A sealant may be filled in between the second joining surface and the cover.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
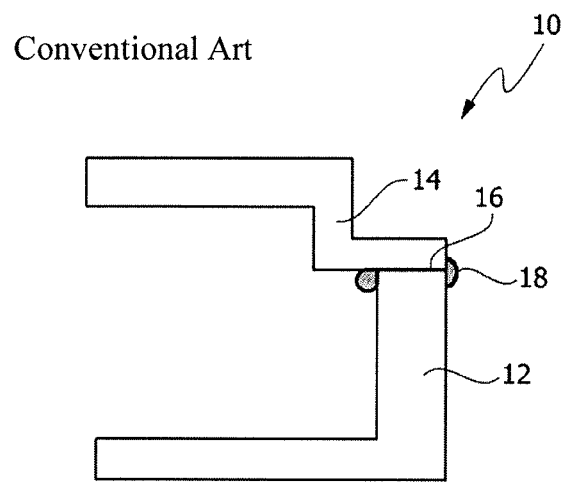
FIG. 1 illustrates an example structure for waterproof and dustproof characteristics of an apparatus of housing component.

As the present invention is amenable to various modifications and alternative forms of embodiments, certain particular embodiments will be described in connection with drawings. However, it should be understood that the intention is not to limit the invention to the particular embodiments described but is to cover all modifications, equivalents, and alternatives falling within the technical spirit and scope of the invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

The terminology used herein to describe embodiments of the invention is not intended to limit the scope of the present invention. As used herein, the singular forms "a," "an," and "the" are intended to include the plural forms as well, unless the context clearly indicates otherwise. It should be further understood that the terms "comprises," "comprising," "includes," and/or "including," when used herein, specify the presence of stated features, integers, steps, operations, elements, components and/or a combination thereof but do not preclude the presence or addition of one or more other features, integers, steps, operations, elements, components, and/or a combination thereof.

Unless otherwise defined, all terms including technical and scientific terms used herein each have the same meaning as commonly understood by one of ordinary skill in the art to which this present invention belongs. It should be further understood that terms, such as those defined in commonly used dictionaries, should be interpreted as each having a meaning that is consistent with its meaning in the context of the relevant art and are not to be interpreted in an idealized or overly formal sense unless expressly so defined herein.

Hereinafter, embodiments of the present invention will be described in detail with reference to accompanying drawings. In the description with reference to the accompanying drawings, like elements are designated by the same reference numerals regardless of drawing numbers, and duplicated descriptions will be omitted.

Figure 2:
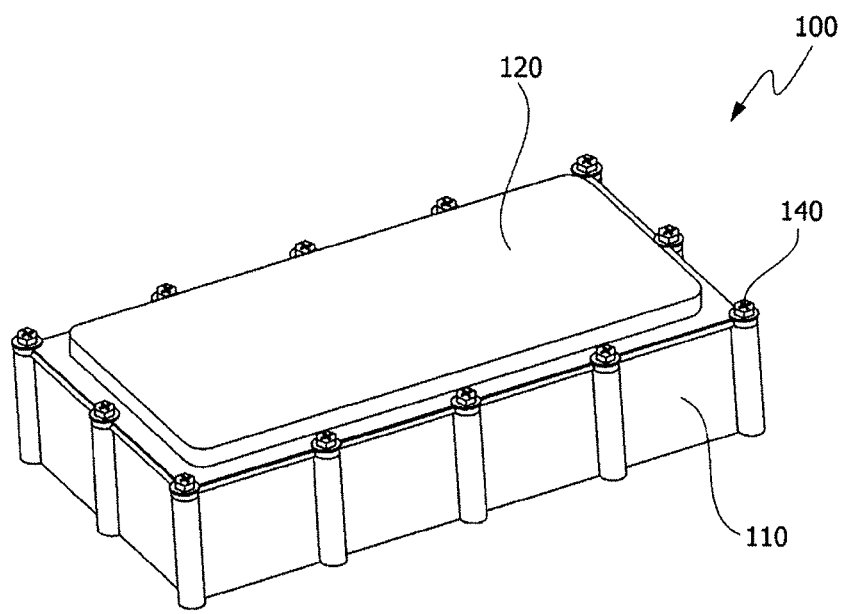
FIG. 2 is a perspective view illustrating an apparatus of housing vehicle component according to one embodiment of the present invention.
Figure 3:
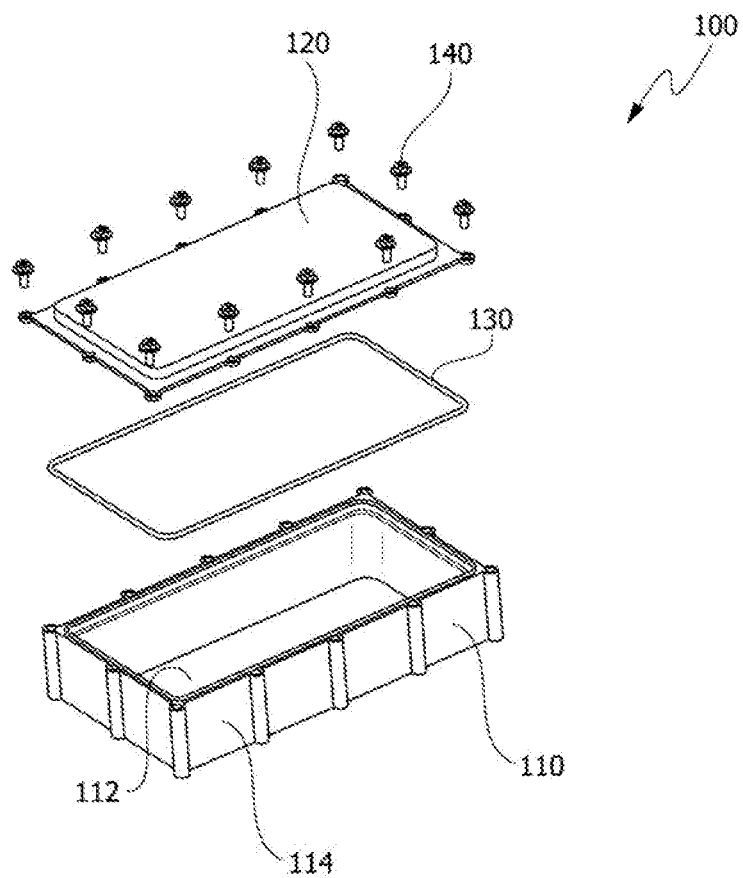
FIG. 3 is an exploded view illustrating an apparatus of housing vehicle component according to one embodiment of the present invention.
Figure 4:
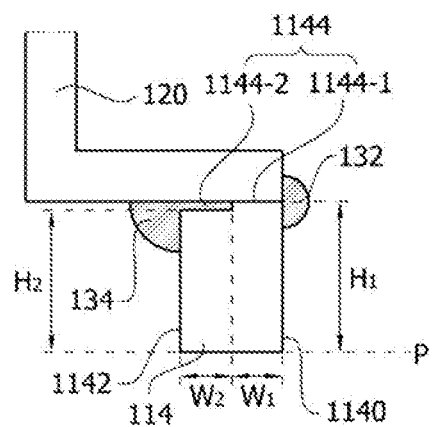
FIG. 4 illustrates a structure for waterproof and dustproof characteristics of an apparatus of housing vehicle component according to one embodiment of the present invention.

FIG. 2 is a perspective view illustrating an apparatus of housing vehicle component according to one embodiment of the present invention, FIG. 3 is an exploded view illustrating an apparatus of housing vehicle component according to one embodiment of the present invention, and FIG. 4 illustrates a structure for waterproof and dustproof characteristics of an apparatus of housing vehicle component according to one embodiment of the present invention.

Referring to FIGS. 2 to 4, an apparatus of housing vehicle component 100 includes a lower case 110, an upper cover 120, and a sealant 130.

Figure 5:
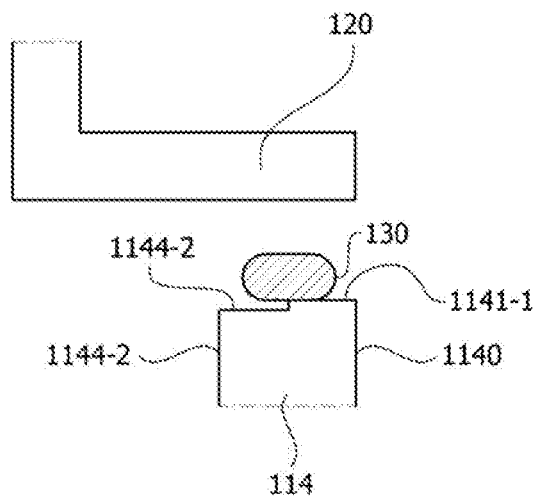
FIG. 5 illustrates an example in which a sealant is formed between a lower case and an upper cover of an apparatus of housing vehicle component according to one embodiment of the present invention.

The lower case 110 accommodates vehicle components. To this end, the lower case 110 includes a bottom portion 112 and a side portion 114 which extends upward from the bottom portion 112. In addition, the side portion 114 includes an outer surface 1140 formed on an outer side portion of the lower case 110, an inner surface 1142 formed on an inner side portion of the lower case 110, and a joining surface 1144 which connects the outer surface 1140 and the inner surface 1142. The upper cover 120 covers the lower case 110. Here, the sealant 130 is applied onto the joining surface 1144 in which the lower case 110 and the upper cover 120 are joined together. Accordingly, the lower case 110 and the upper cover 120 may be joined together with tight sealing. As illustrated in FIG. 5, the sealant 130 is applied on the joining surface 1144 of the lower case 110 and may be pressed together with the upper cover 120. For example, the sealant 130 may be injected from an outlet nozzle of an automatically controlled robot. The sealant 130, for example, may include a thermosetting silicone resin.

In addition, the lower case 110 and the upper cover 120 may be engaged together by a bolt 140. Here, at least one of the lower case 110 and the upper cover 120 may be aluminum material or steel material. For example, at least one of the lower case 110 and the upper cover 120 may be formed of aluminum material having a thickness of 3 mm or more by a die casting process or formed of steel material having a thickness of about 1 mm by a press process.

Referring to FIG. 4, a step is formed at the joining surface 1144 in which the lower case 110 and the upper cover 120 are joined together. Here, the step is referring to a difference in height. That is, the joining surface 1144 may include a first joining surface 1144-1 and a second joining surface 1144-2 having heights different from each other. Here, the first joining surface 1144-1 near the outer side portion of the lower case 110 may be formed to be higher than the second joining surface 1144-2 near the inner side portion of the lower case 110. Accordingly, the outer surface 1140 formed at the outer side portion of the lower case 110 may be formed to be higher than the inner surface 1142 formed at the inner side portion of the lower case 110.

As described above, when the step is formed at the joining surface 1144 in which the lower case 110 and the upper cover 120 are joined together, contact area to be sealed by the sealant 130 between the joining surface 1144 and the upper cover 120 becomes wide. Accordingly, the lower case 110 and the upper cover 120 may be more tightly sealed.

In addition, when the second joining surface 1144-2 near the inner side portion of the lower case 110 is formed to be lower than the first joining surface 1144-1 near the outer side portion of the lower case 110, a large amount of the sealant is filled between the second joining surface 1144-2 and the upper cover 120. Therefore, the inner side portion of the lower case 110 may be maintained with more tight sealing.

Meanwhile, sealant beads 132 and 134 may be individually formed at a region in which the upper cover 120, the outer surface 1140 of the lower case 110, and the first joining surface 1144-1 of the lower case 110 join together and at a region at which the upper cover 120, the inner surface 1142 of the lower case 110, and the second joining surface 1144-2 of the lower case 110 join together. The sealant beads 132 and 134 may be formed as the sealant 130 applied on the joining surface 1144 of the lower case 110 is pressed together with the upper cover 120, leaks outside from the space between the joining surface 1144 of the lower case 110 and the upper cover 120, and hardens. The sealant bead 132 formed at a side of the first joining surface 1144-1 and the sealant bead 134 formed at a side of the second joining surface 1144-2 may serve the role of preventing air or water from penetrating into the apparatus of housing vehicle component 100.

Here, the step between the first joining surface 1144-1 and the second joining surface 1144-2, that is a difference between a height H1 of the outer surface 1140 of the lower case 110 and a height H2 of the inner surface 1142 of the lower case 110 with respect to a reference surface P may be in a range of 0.3 to 2 mm, preferably in a range of 0.4 to 1.5 mm, and more preferably in a range of 0.5 to 1 mm. When a height of the step is less than 0.3 mm between the first joining surface 1144-1 and the second joining surface 1144-2, effects of the waterproofing and dustproofing are decreased because an amount of the sealant filled in the joining surface 1144 is too small. In addition, when a height of the step between the first joining surface 1144-1 and the second joining surface 1144-2 exceeds 2 mm, there arises a problem in which cost increases.

In addition, a ratio of a width W1 of the first joining surface 1144-1 to a width W2 of the second joining surface 1144-2 may be in a range of 1:1 to 1:2. When the width of the second joining surface 1144-2 is smaller than the width of the first joining surface 1144-1, effects of the waterproofing and dustproofing are decreased because the amount of the sealant between the upper cover 120 and the second joining surface 1144-2 is small. In addition, when the width of the second joining surface 1144-2 exceeds twice the width of the first joining surface 1144-1, cost increases due to the amount of the sealant to be filled in between the upper cover 120 and the second joining surface 1144-2, and there arises a problem in which mechanical strength of the binding the upper cover 120 and the lower case 110 is decreased because a joining area of the upper cover 120 to the lower case 110 is small.

Figure 6:
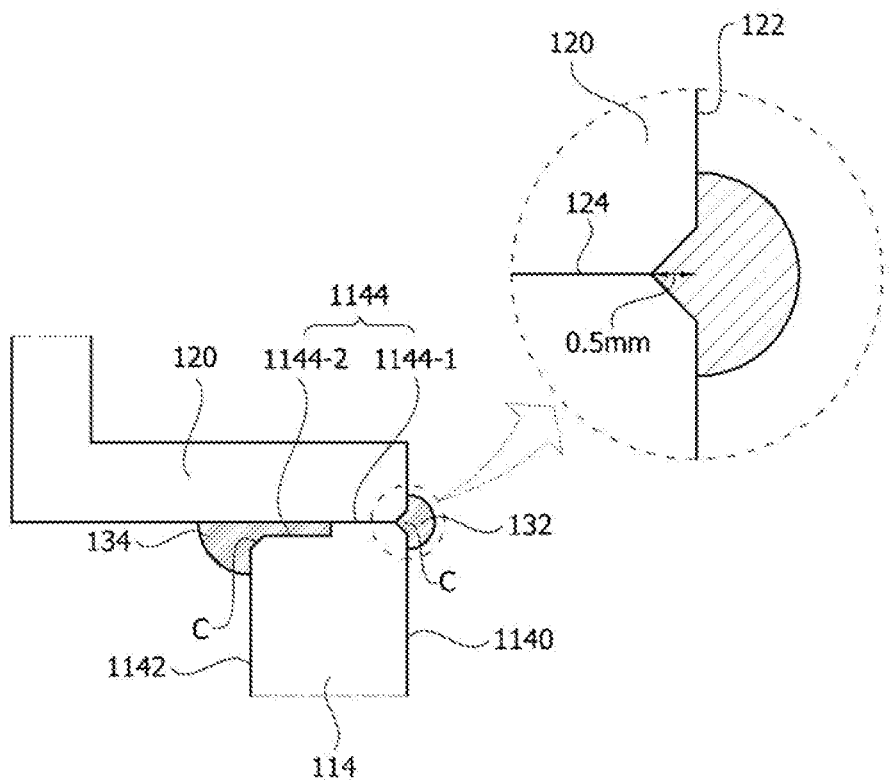
FIG. 6 illustrates a structure for waterproof and dustproof characteristics of an apparatus of housing vehicle component according to another embodiment of the present invention.

FIG. 6 illustrates a structure for waterproof and dustproof characteristics of an apparatus of housing vehicle component according to another embodiment of the present invention.

Referring to FIG. 6, a chamfer C is formed at a joining surface 1144 of a lower case 110. Here, the chamfer is referring to a beveled corner and may be formed at a boundary at which an outer surface 1140 of the lower case 110 and the joining surface 1144 join together and at a boundary at which an inner surface 1142 of the lower case 110 and the joining surface 1144 join together.

As described above, when the chamfer C is formed at the joining surface 1144 of the lower case 110, silicone bids 132 and 134 may be formed to be round compared to a case without the chamfer. That is, when a sealant applied on the joining surface 1144 of the lower case 110 is pressed together with an upper cover 120, the sealant is guided by the chamfer C formed in the joining surface 1144, and thereby silicone bead in a round shape may be formed. The waterproof and dustproof characteristics of an apparatus of housing vehicle component 100 may be increased as the silicone bead is formed to be more rounded. Here, a depth of the chamfer C may be about 0.5 mm.

According to the embodiments of the present invention, the chamfer may also be formed at the upper cover 120. That is, as illustrated in FIG. 6, a chamfer may also be formed at a boundary at which an outer surface 122 of the upper cover 120 and a joining surface 124 of the upper cover 120 join together. As described above, when a chamfer is formed at both of the lower case 110 and the upper cover 120, the silicone bead may be formed to be further round.

Table 1 is a table in which waterproof and dustproof characteristics of apparatuses of housing component according to a comparative reference example and the embodiments are compared.

Embodiment 1 has a joining surface between a lower case and an upper cover which is the same as the structure in FIG. 4 in which a width of a first joining surface and a width of a second joining surface are the same and a height of a step therebetween is formed to be 0.5 mm, Embodiment 2 has a joining surface between the lower case and the upper cover which is the same as the structure in FIG. 6 in which a width of the first joining surface and a width of the second joining surface are the same, a height of the step therebetween is formed to be 0.5 mm, and a chamfer having 0.5 mm depth is individually formed at an outer surface and inner surface of the lower case, and Comparative reference example has a joining surface between the lower case and the upper cover which is the same as the structure in FIG. 1.

A process including placing apparatuses of housing component of Embodiment 1, Embodiment 2, and Comparative reference example in a chamber at 105° C. for 30 minutes and then placing the apparatuses of housing component in water at 0° C. was repeated 15 times, and then a test of whether water was penetrated into the apparatuses of housing component was performed using a test apparatus for water leak.

TABLE 1

| | Test Number | | |
|---|---|---|---|
| | Embodiment 1 | Embodiment 2 | Comparative reference example |
| Test Result | Pass | Pass | Fail |

Referring to Table 1, as in the embodiments of the present invention, it is seen that the waterproof and dustproof characteristics are excellent when the step is formed at the joining surface.

Accordingly, the apparatus of housing component according to the embodiment of the present invention may satisfy requirements of good waterproof characteristics and high dustproof characteristics even when vehicle components are accommodated therein. In addition, degradation of the waterproof and dustproof characteristics due to bending at the upper cover or lower case may be minimized even when a steel material processed by a press type process is used according to a trend of using thinner and thinner plates for the lower case and upper cover of the apparatus of housing component.

According to the embodiments of the present invention, waterproof and dustproof characteristics can be enhanced. Particularly, using only a small amount of a sealant, the lower case and upper cover can be tightly sealed. In addition, the sealing can be solidly achieved even when the lower case and upper cover are bent.

While the present invention has been described in connection with preferable embodiments, it should be understood to those skilled in the art that various changes and modifications may be made therein without departing from the spirit and scope of the invention as defined by the appended claims.

REFERENCE NUMERALS

100: APPARATUS OF HOUSING VEHICLE COMPONENT
110: LOWER CASE
120: UPPER COVER
130: SEALANT
112: BOTTOM PORTION
114: SIDE PORTION
1140: OUTER SURFACE
1142: INNER SURFACE
1144: JOINING SURFACE
132, 134: SEALANT BEAD

What is claimed is:

1. A housing, comprising:
a case configured to accommodate a component, the case including:
a case bottom surface;
a case side surface projecting in a vertical direction from the case bottom surface;
an opening defined by the case side surface; and
an interior defined by the case side surface and the case bottom surface;
a cover covering the opening of the case, the cover including a cover bottom surface being substantially planar, and the cover bottom surface being substantially parallel with the case bottom surface; and
a sealant provided between a joining surface of the case and a portion of the cover bottom surface,
wherein the case side surface includes:
a first surface facing outside of the case;
a second surface facing the interior of the case and being opposite to the first surface; and
the joining surface, wherein the joining surface of the case faces the portion of the cover bottom surface and an entirety of the joining surface receives the sealant,
wherein the joining surface of the case includes:
a first joining surface extending from the first surface of the case side surface; and
a second joining surface extending from the second surface of the case side surface, and
wherein the first joining surface has a greater height than the second joining surface.

2. The housing of claim 1, wherein a difference between the height of the first joining surface and the height of the second joining surface is in a range of 0.3 to 2 mm.

3. The housing of claim 1, wherein the sealant includes:
a first sealant bead formed at a region between the cover bottom surface and the first joining surface; and
a second sealant bead formed at a region between the cover and the second joining surface.

4. The housing of claim 3, wherein the first sealant bead and the second sealant bead are individually joined to the first joining surface and the second joining surface, respectively.

5. The housing of claim 4, wherein the first sealant bead and the second sealant bead have a round shape.

6. The housing of claim 1, wherein a chamfer is formed at least one of a boundary at which the first surface and the first joining surface join together and a boundary at which the second surface and the second joining surface join together.

7. The housing of claim 6, wherein the chamfer is further formed in a boundary at which a surface formed at an outer side portion of the case is joined to the first joining surface of the case.

8. The housing of claim 1, wherein the sealant extends past the second joining surface toward the interior of the case, the sealant extending in a horizontal direction, the horizontal direction being perpendicular to the vertical direction.

9. The housing of claim 1, wherein the cover further includes a cover side surface extending from the cover bottom surface in the vertical direction and being substantially perpendicular to the cover bottom surface.

10. The housing of claim 1, wherein the joining surface comprises only the first and second joining surfaces.

11. A housing, comprising:
a case configured to accommodate a component, the case including:
a case bottom surface;
a case side surface projecting in a vertical direction from the case bottom surface;
an opening defined by the case side surface; and
an interior defined by the case side surface and the case bottom surface; and
a cover connected to the case and covering the opening of the case, the cover including a cover bottom surface being substantially planar, and the cover bottom surface being substantially parallel with the case bottom surface,
wherein the case side surface includes:
a first surface facing outside of the case;
a second surface facing the interior of the case and being opposite to the first surface; and
a joining surface facing the cover bottom surface and being adjoined to the cover bottom surface,
wherein the joining surface includes a first joining surface and a second joining surface having heights different from each other and an entirety of the joining surface is coated with a sealant.

12. The housing of claim 11, wherein the first joining surface is connected to the first surface, the second joining surface is connected to the second surface, and the first joining surface is formed to be higher than the second joining surface.

13. The housing of claim 11, wherein the second joining surface and the cover are spaced apart from each other by a first distance, and the first distance between the second joining surface and the cover is filled with the sealant.

14. The housing of claim 11, wherein a height of a step between the first joining surface and the second joining surface is in a range of 0.3 to 2 mm.

15. The housing of claim 11, wherein a ratio of a width of the first joining surface to a width of the second joining surface is in a range of 1:1 to 1:2.

16. The housing of claim 11, wherein the sealant includes:
a first sealant bead formed at a region between the cover and the first joining surface; and
a second sealant bead formed at a region between the cover and the second joining surface.

17. The housing of claim 16, wherein the first sealant bead and the second sealant bead are individually joined to the first surface and the second surface, respectively.

18. The housing of claim 11, wherein the sealant extends past the second joining surface toward the interior of the case, the sealant extending in a horizontal direction, the horizontal direction being perpendicular to the vertical direction.

19. The housing of claim 11, wherein the cover further includes a cover side surface extending from the cover bottom surface in the vertical direction and being substantially perpendicular to the cover bottom surface.

20. The housing of claim 11, wherein the joining surface comprises only the first and second joining surfaces.

* * * * *